(12) United States Patent
Arndt et al.

(10) Patent No.: US 6,802,296 B2
(45) Date of Patent: Oct. 12, 2004

(54) FUEL INJECTION SYSTEM

(75) Inventors: Stefan Arndt, Stuttgart (DE); Werner Herden, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/332,300

(22) PCT Filed: Jul. 3, 2001

(86) PCT No.: PCT/DE01/02399

§ 371 (c)(1),
(2), (4) Date: Jun. 11, 2003

(87) PCT Pub. No.: WO02/02929

PCT Pub. Date: Jan. 10, 2002

(65) Prior Publication Data

US 2004/0011324 A1 Jan. 22, 2004

(51) Int. Cl.[7] .............................. F02M 61/18
(52) U.S. Cl. .................. 123/299; 123/305; 239/533.12
(58) Field of Search ................... 123/276, 279, 123/299, 300, 305; 239/533.12

(56) References Cited

U.S. PATENT DOCUMENTS

| 4,919,093 A | * | 4/1990 | Hiraki et al. ............... 123/299 |
| 5,540,200 A | | 7/1996 | Naitoh et al. ............... 123/299 |
| 5,941,207 A | | 8/1999 | Anderson et al. ........... 123/295 |
| 6,186,418 B1 | | 2/2001 | Tani ....................... 239/533.2 |
| 6,742,493 B2 | * | 6/2004 | Ziegler et al. .............. 123/305 |

FOREIGN PATENT DOCUMENTS

| DE | 38 08 635 | 9/1989 |
| DE | 196 42 653 | 1/1998 |
| DE | 198 27 219 | 1/1999 |
| EP | 1 006 265 | 6/2000 |
| JP | 2000 104647 | 4/2000 |

OTHER PUBLICATIONS

Patent Abstract of Japan, vol. 2000, No. 7, Sep. 29, 2000.

* cited by examiner

Primary Examiner—Tony M. Argenbright
(74) Attorney, Agent, or Firm—Kenyon & Kenyon

(57) ABSTRACT

A fuel injection system for internal combustion engines includes a fuel injector that includes a spray-orifice plate through which fuel is injected into a combustion chamber. The combustion chamber is bounded by a cylinder wall. A piston is guided in the cylinder wall, and a spark plug projects into the combustion chamber. The diameters of injection orifices positioned on the spray-orifice disk are distributed such that, at a particular point of injection, the injected fuel is distributed as homogenously as possible in an injection volume of the combustion chamber, bounded by the piston and the cylinder wall.

9 Claims, 2 Drawing Sheets

FUEL INJECTION SYSTEM

FIELD OF THE INVENTION

The present invention relates to a fuel injection system.

BACKGROUND INFORMATION

A method for forming an ignitable fuel/air mixture is discussed in German Patent No. 196 42 653. An ignitable fuel/air mixture may be formed in the cylinders of internal combustion engines having direct injection in that fuel is injected by an injector into each combustion chamber bounded by a piston, in response to the release of a nozzle orifice as the result of a valve member lifting off from a valve seat that encircles the nozzle orifice. To produce an internal mixture formation that is optimized with respect to consumption and emissions, in every operating point of the entire characteristics map, under all operating conditions of the internal combustion engine, e.g., in stratified operation, the opening stroke (lift) of the valve member and the injection time are variably adjustable.

German Published Patent Application No. 38 08 635 discusses a fuel injection device for the direct injection of fuel into the cylinder of a mixture-compressing internal combustion engine. The fuel injection device includes a fuel injector, which is positioned in the cylinder wall at a distance to the cylinder head and across from the discharge orifice, and an outlet opening, the jet axis of the fuel injector being directed to the region around the spark plug positioned in the cylinder head. The fuel injector includes a magnet-activated valve needle provided with helical grooves to generate a swirl flow of the injection jet. The jet axis of the fuel injector is directed to the ignition point-disposed in the center of the cylinder head.

Moreover, a device for the injection of fuel into the combustion chamber of a mixture-compressing internal combustion engine having external ignition is discussed in U.S. Pat. No. 5,941,207, in which the fuel is injected, in the shape of a cone, into the combustion chamber at a specific initial angle. The injected fuel fills up the combustion chamber in the shape of a cone, the effects of wall wetting being largely suppressed. During the compression phase, a piston having a relatively flat configuration deforms the injected fuel cloud into a spherical shape. The spherical mixture cloud mixes with the supplied air to a negligible degree at most and, while being compressed further, is guided to the spark gap of the spark plug.

German Published Patent Application No. 198 27 219 discusses a fuel injector for an internal combustion engine that includes a disk for adjusting the fuel jet. It is provided with first nozzle orifices configured along a first circle, which is positioned coaxially to a center axis of the valve body. Moreover, second nozzle orifices are provided, which are disposed along a second circle which is positioned coaxially to the center axis and has a larger diameter than that of the first circle. Each hole axis of the second nozzle orifices forms an acute angle with a reference plane that is perpendicular to the center axis of the valve body. The acute angle is smaller than that which is formed by each hole axis of the first nozzle orifices with the reference plane. Therefore, fuel atomizations, which are injected through the first nozzle orifices, may be directed away from the fuel atomizations that are injected through the second nozzle orifices. As a result, the fuel atomizations, injected through the various circles of nozzle orifices, do not interfere with one another.

The methods or devices for the injection of fuel into the combustion chamber of a mixture-compressing internal combustion engine having external ignition discussed in the aforementioned printed publications, are the complicated combustion-chamber geometries that are required in order to mix the injected fuel with the supplied air, to form an ignitable fuel/air mixture and to convey it for ignition to the vicinity of the spark gap of the spark plug. On the one hand, such combustion-chamber geometries are difficult to produce, and, on the other hand, it is impossible to optimize the combustion with regard to the nitrogen-oxide emission and fuel consumption.

Moreover, in most cases, the spark plug is directly exposed to the fuel of the fuel injector. This not only exposes the spark plug to heavy thermal shock loads, but also results in carbon deposits on the spark plug electrodes, thereby considerably limiting the service life of the spark plug. The fuel injector discussed in German Published Patent Application No. 198 27 219 provides that the fuel, injected into the combustion chamber at different injection angles, for the most part, hits the walls of the combustion chamber or the piston, where it cools. For that reason, its combustion is associated with high pollutant emission or the development of soot.

SUMMARY OF THE INVENTION

The fuel injection system according to the present invention provides that, due to the special configuration of the fuel injector relative to the combustion chamber, the injection jet is guided in such a manner that the mixture cloud fills up the combustion chamber in an optimal manner.

This may prevent the wetting of the combustion-chamber walls, may allow a low-emission and low-consumption combustion process.

The configuration of the spray-orifice plate of the fuel injector, which produces a mixture cloud that is able to optimally fill up the combustion chamber.

The disk-shaped configuration of the spray-orifice plate is easy to produce and is able to be installed in standard fuel injectors.

A plurality of rows of injection orifices is arranged on the spray-orifice disk, to provide a raster configuration that may be adapted as needed.

The choice of different diameters of the injection orifices provides that, on the one hand, the jet pattern is able to be formed in this manner and, on the other hand, the stoichiometry of the mixture cloud is able to be influenced.

The positioning of the fuel injector relative to the spark plug has the result that the spark plug is not directly exposed to the fuel jet, since the injection jet moves tangentially to the spark plug, thereby extending its service life.

DETAILED DESCRIPTION

Figure 1:
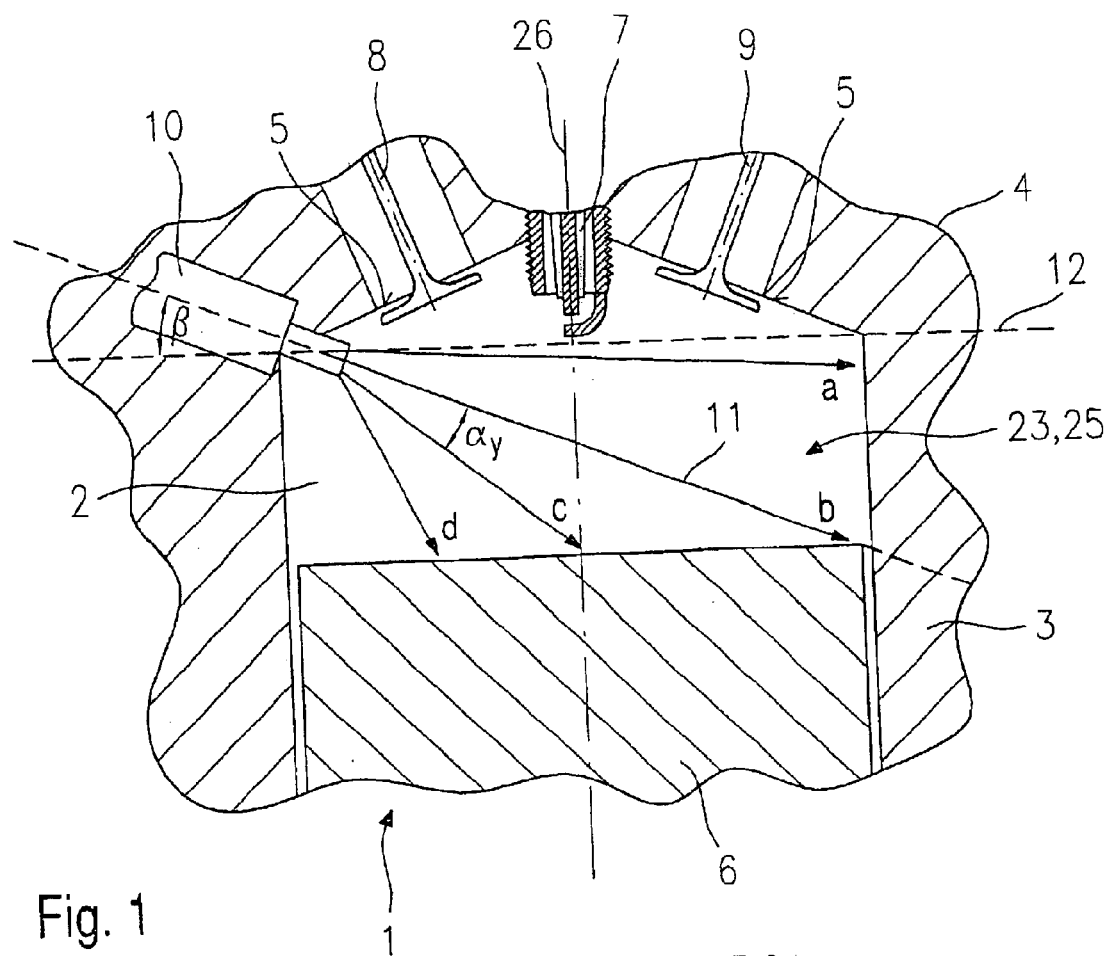
FIG. 1 shows a longitudinal section through an example embodiment of the fuel injection system according to the present invention.

FIG. 1, in a part-sectional schematized view, shows a first example embodiment of a fuel injection system 1, configured according to the present invention, for a mixture-compressing internal combustion engine having external ignition.

Fuel injection system 1 includes a combustion chamber 2, which is bounded by cylinder walls 3, a cylinder head 4 which includes ridge slopes 5, and a piston 6. A spark plug 7 is positioned, for example, to centrally project into combustion chamber 2. An intake valve 8 and a discharge valve 9 are sketched at ridge slopes 5.

A fuel injector 10 is positioned between cylinder wall 3 and cylinder head 4 in such a manner that fuel is injected into combustion chamber 2 in a plurality of injection planes 11. Four injection planes 11 are provided in the present example embodiment. Fuel injector 10 is tilted at an angle β with respect to a plane 12 that runs perpendicularly to a longitudinal axis 26 of combustion chamber 2. Injection planes 11 are injected into combustion chamber 2 at a constant angle $\alpha_y$ with respect to one another. Injection planes 11 are made up of injection jets 20, which form a jet pattern that is described in greater detail in FIG. 2. The outer form of the injected mixture cloud 25, or envelope 24, of all injection jets 20, thus assumes a cylindrical form, which corresponds approximately to the shape of combustion chamber 2.

Figure 2:
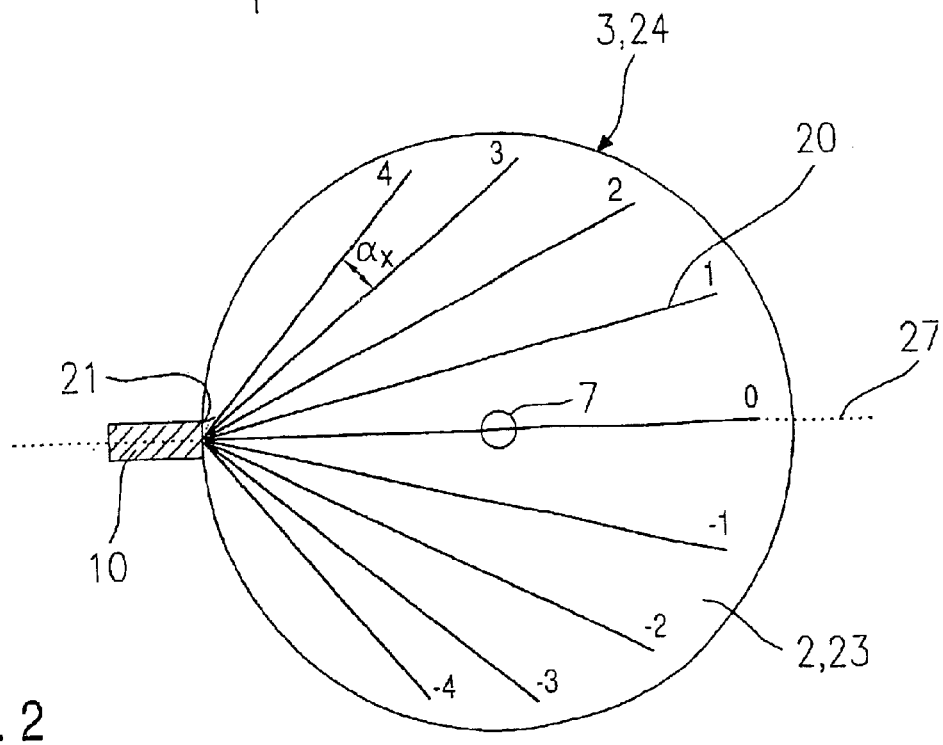
FIG. 2 shows a section through a mixture cloud generated in the combustion chamber by a fuel injection system according to the present invention.

FIG. 2, in a sectional view through combustion chamber 2, shows the jet pattern generated by the first example embodiment of a fuel injection system 1, configured according to the present invention, as shown in FIG. 1. According to FIG. 1, fuel injector 10 injects the fuel into combustion chamber 2 in four injection planes 11. In the present example embodiment, each of the four injection planes 11 includes nine injection jets.

A combined view of FIGS. 1 and FIG. 2 reveals that, in the present first example embodiment, a total of thirty-six injection jets 20, which are disposed in four injection planes 11, are injected into combustion chamber 2. Injection planes 11 have the constant angular distance $\alpha_y$, injection jets 20 of each injection plane 11 having an angular distance $\alpha_x$. However, this is not constant, but decreases from the inner injection jets towards the outside. The following table provides an overview of the spacings of injection jets 20 and injection planes 11 for the first example embodiment.

of mixture cloud 25. These configurations have been entered in FIGS. 1 and 2.

Figure 3:
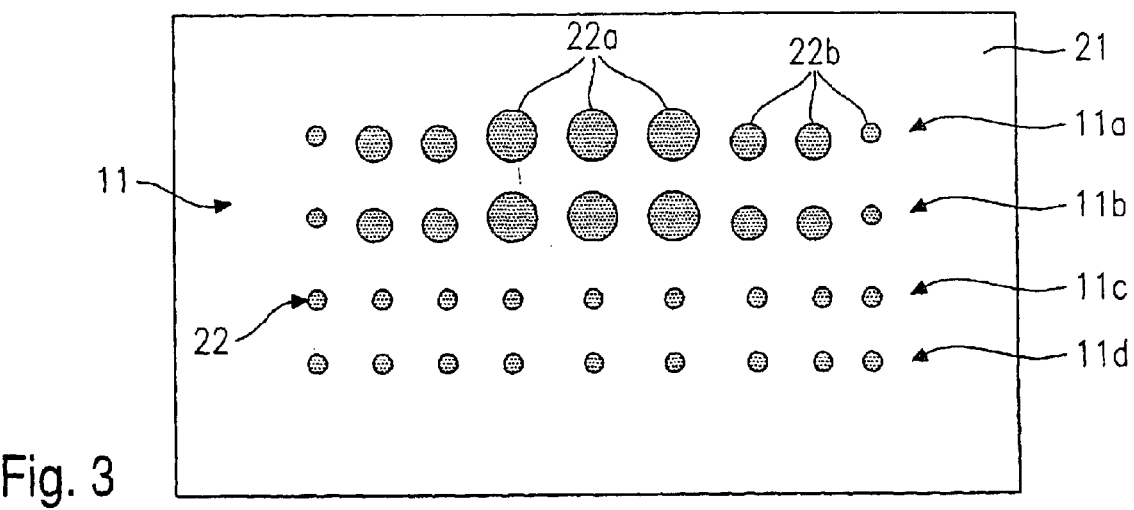
FIG. 3 shows a plan view of a first example embodiment of a spray-orifice plate of a fuel injector for a fuel injection system according to the present invention.

FIG. 3 is a plan view of a first example embodiment of a spray-orifice disk 21 of fuel injector 10 of fuel injection system 1 configured according to the present invention. Spray-orifice disk 21 shown in FIG. 3 produces the jet pattern represented in FIGS. 1 and 2.

In the present example embodiment, thirty-six injection orifices 22 are configured on spray-orifice disk 21 in four injection planes 11. Nine injection orifices 22 are configured in first injection plane 11a, in second injection plane 11b, in third injection plane 11c and in fourth injection plane 1id respectively. The configuration of spray orifices 22, thus, corresponds approximately to a rectangular raster.

To completely fill up injection volume 23, which is a sub-space of combustion chamber 2, spray orifices 22 of injection planes 11 have different diameters. The inner injection orifices 22a of first and second injection plane 11a and 11b; have a larger diameter than outer injection orifices 22b of these planes. In contrast, the diameters of injection orifices 22 of third and fourth injection plane 11c and 1d are smaller. As a result of the different diameters of injection orifices 22, injection jets 20 of the various injection planes 11 penetrate combustion chamber 2 to different depths. Fuel injected through inner injection orifices 22a of first or second injection plane 11a or 11b nearly reaches cylinder wall arranged diagonally across from fuel injector 10, whereas injector jets 20, injected through injection orifices 22 of third and fourth injection plane 11c and 11d, are more likely injected in the direction of piston 6 and, due to the smaller diameter of injection orifices 22, cover smaller distances in combustion chamber 2.

Thus, the arrangement and nature of injection orifices 22 and injection planes 11 may be selected suck that combustion chamber 2 is nearly entirely filled with injected fuel, without cylinder wall 3 or piston 6 being wetted too much. As a result, the fuel consumption is reduced, and the nitrogen oxide emissions decline as well.

Due to the configuration of injection orifices 22, their diameter, and the horizontal and vertical angular distances of

| Injection jet | −4 | −3 | −2 | −1 | 0 | 1 | 2 | 3 | 4 |
|---|---|---|---|---|---|---|---|---|---|
| Injection plane a | | | | | | | | | |
| $\alpha_x$ | −50° | −39° | −27° | −14° | 0° | 14° | 27° | 39° | 50° |
| $\alpha_y$ | 9° | 9° | 9° | 9° | 9° | 9° | 9° | 9° | 9° |
| Injection plane b | | | | | | | | | |
| $\alpha_x$ | −50° | −39° | −27° | −14° | 0° | 14° | 27° | 39° | 50° |
| $\alpha_y$ | 0° | 0° | 0° | 0° | 0° | 0° | 0° | 0° | 0° |
| Injection plane c | | | | | | | | | |
| $\alpha_x$ | −50° | −39° | −27° | −14° | 0° | 14° | 27° | 39° | 50° |
| $\alpha_y$ | −9° | −9° | −9° | −9° | −9° | −9° | −9° | −9° | −9° |
| Injection plane d | | | | | | | | | |
| $\alpha_x$ | −50° | −39° | −27° | −14° | 0° | 14° | 27° | 39° | 50° |
| $\alpha_y$ | −18° | −18° | −18° | −18° | −18° | −18° | 18° | −18° | −18° |

The injection planes are denoted consecutively from a through d; a denotes injection plane 11 which is closest to spark plug 7. The numbers from −4 through 4 denote the individual injection jets 20, symmetrically to center axis 27 the individual injection jets 20 to one another, spray-orifice disk 21 gives injected mixture cloud 25 approximately to form of injection volume 23. Envelope 24 of all injection jets 20 and injection planes 11, thus, is provided with a cylindrical form, which corresponds approximately to the shape of the area of combustion chamber 2 left free by piston 6.

The numerical diameters of the individual injection orifices 22 may be 100 μm, for instance, for inner injection orifices 22a, while the diameter of the outer injection orifices 22b or injection orifices 22 of third and fourth injection planes 11c and 11d may be 25 μm, for instance.

Figure 4:
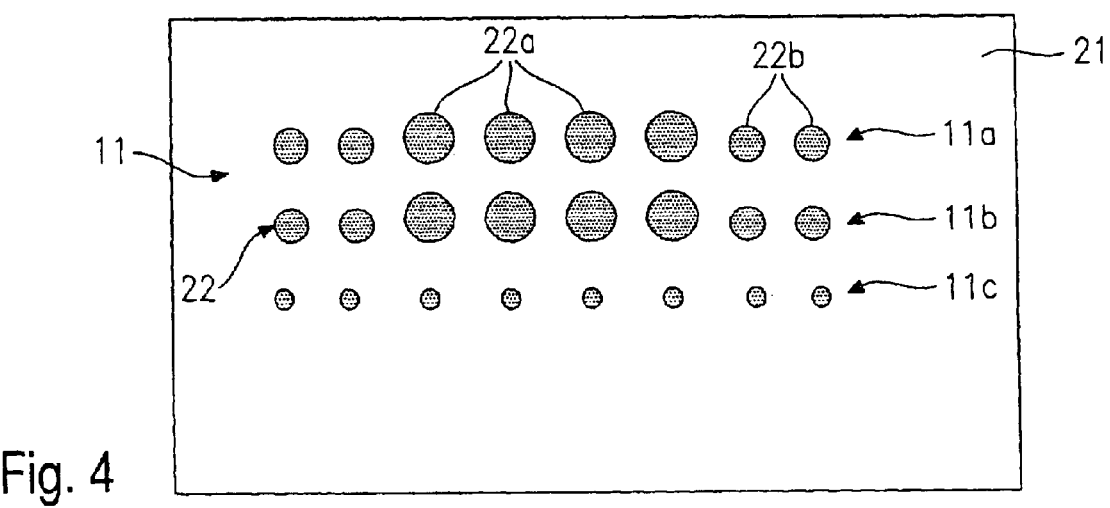
FIG. 4 shows a plan view of a second example embodiment of a spray-orifice plate.

FIG. 4 shows a second example embodiment of a spray-orifice disk 21 of fuel injector 10 of fuel injection system 1 configured according to the present invention. In contrast to spray-orifice disk 21 shown in FIG. 3, spray-orifice disk 21 of the present example embodiment includes only three injection orifices 22 each are positioned. This results in a total number of twenty-four injection orifices 22. In a section through fuel injection system 1, which corresponds to FIG. 1, three injection planes 11a, 11b and 11c would thus be available to fill up injection volume 23.

Injection orifices 22, once again, have different diameters. In the present example embodiment, four inner injection orifices 22a have a diameter of approximately 100 μm, whereas the injection orifices of third plane 11c and outer injection orifices 22b may have a diameter of 50 μm, for instance.

In the following table, the tilting angles of injection planes 11 and injection jets 20 with respect to one another are listed for the second example embodiment.

| Injection jet | −4 | −3 | −2 | −1 | 1 | 2 | 3 | 4 |
|---|---|---|---|---|---|---|---|---|
| Injection plane a | | | | | | | | |
| $\alpha_x$ | −47° | −35° | −22° | −8° | 8° | 22° | 35° | 47° |
| $\alpha_y$ | 10° | 10° | 10° | 10° | 10° | 10° | 10° | 10° |
| Injection plane b | | | | | | | | |
| $\alpha_x$ | −47° | −35° | −22° | −8° | 8° | 22° | 35° | 47° |
| $\alpha_y$ | 0° | 0° | 0° | 0° | 0° | 0° | 0° | 0° |
| Injection plane c | | | | | | | | |
| $\alpha_x$ | −47° | −35° | −22° | −8° | 8° | 22° | 35° | 47° |
| $\alpha_y$ | −10° | −10° | −10° | −10° | −10° | −10° | −10° | −10° |

Injection plane a, once again is closest to spark plug 7.

Figure 5:
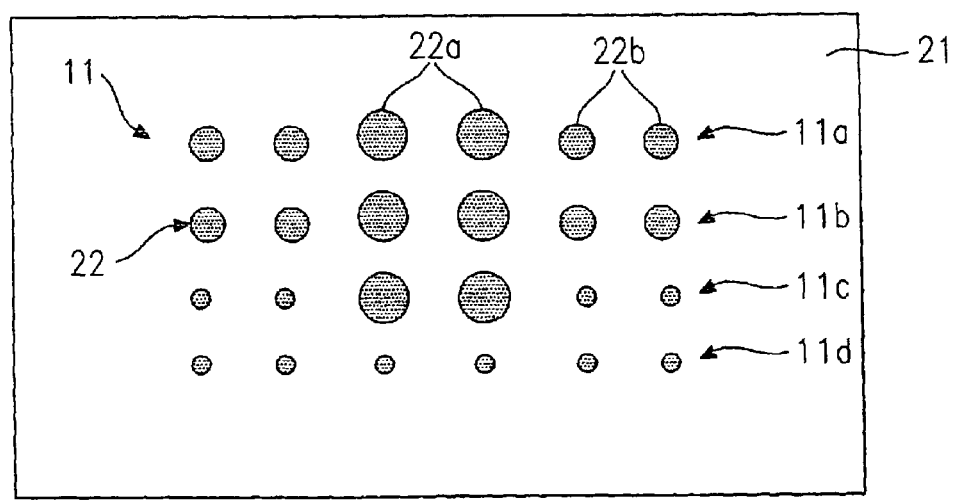
FIG. 5 shows a plan view of a third example embodiment of a spray-orifice disk.

FIG. 5 represents a third example embodiment of spray-orifice disk 21 of fuel injector 10 of fuel injection system 1 according to the present invention. As in the first example embodiment, injection orifices 22 are configured in four injection planes 11. However, in the present example embodiment, there are only six injection orifices 22 per injection plane 11. This results in a total number of twenty-four injection orifices 22 on spray-orifice disk 21. Inner injection orifices 22a have a diameter of 100 μm, for instance, while outer injection orifices 22b have a diameter of 50 μm. Injection orifices 22 of fourth injection plane 11d are again the smallest.

In the following table, the tilting angles of injection planes 11 and injection jets 20 with respect to one another are listed for the third example embodiment.

| Injection jet | −3 | −2 | −1 | 1 | 2 | 3 |
|---|---|---|---|---|---|---|
| Injection plane a | | | | | | |
| $\alpha_x$ | −44° | −28° | −10° | 10° | 28° | 44° |
| $\alpha_y$ | 20° | 20° | 20° | 20° | 20° | 20° |
| Injection plane b | | | | | | |
| $\alpha_x$ | −44° | −28° | −10° | 10° | 28° | 44° |
| $\alpha_y$ | 10° | 10° | 10° | 10° | 10° | 10° |
| Injection plane c | | | | | | |
| $\alpha_x$ | −44° | −28° | −10° | 10° | 28° | 44° |
| $\alpha_y$ | 0° | 0° | 0° | 0° | 0° | 0° |
| Injection plane d | | | | | | |
| $\alpha_x$ | −44° | −28° | −10° | 10° | 28° | 44° |
| $\alpha_y$ | −10° | −10° | −10° | −10° | −10° | −10° |

In the present example embodiment as well, injection plane a is closest to spark plug 7.

The present invention is not limited to the example embodiments shown and is also able to be applied to spray-orifice disks having more or fewer injection planes, or more or fewer injection orifices, which may even have different orifice diameters.

What is claimed is:

1. A fuel injection system for an internal combustion engine, comprising:
   a combustion chamber that is bounded by a cylinder wall;
   a piston that is guided in the cylinder wall;
   a fuel injector including a spray-orifice disk containing a plurality of injection orifices through which a fuel is injected into the combustion chamber, diameters of the plurality of injection orifices being arranged on the spray-orifice disk in such a manner that, at a point of injection, the fuel is distributed homogenously in an injection volume of the combustion chamber bounded by the piston and the cylinder wall, and the plurality of injection orifices being arranged on the spray-orifice disk in a plurality of rows in a raster-type configuration; and
   a spark plug that projects into the combustion chamber;
   wherein the fuel injector injects the fuel into the combustion chamber in at least two injection planes that are set apart from one another by an angle.

2. The fuel injection system of claim 1, wherein:
   the at least two injection planes have a constant angular distance.

3. The fuel injection system of claim 2, wherein:
   a jet opening angle of an envelope of a mixture cloud is between 50° and 100°.

4. The fuel injection system of claim 3, wherein:
   injection jets of the at least two injection planes, injected through the plurality of injection orifices into the combustion chamber, have an angular distance that decreases starting from a center axis.

5. The fuel injection system of claim 4, wherein:
   those of the plurality of injection orifices on an edge of at least one of the at least two injection planes are smaller than those of the plurality of injection orifices on an inside of the at least one of the at least two injection planes.

6. The fuel injection system of claim 5, wherein:
   those of the plurality of injection orifices on the edge of at least one of the at least two injection plane are larger than those of the plurality of injection orifices on an edge of a further injection plane of the at least two injection planes.

7. The fuel injection system of claim 1, wherein:
the fuel injector is tilted at an angle with respect to a plane that is perpendicular to a longitudinal axis of the combustion chamber.

8. The fuel injection system of claim 7, wherein:
the angle is between 35° and 55°.

9. The fuel injection system of claim 1, wherein the spray-orifice disk is configured in such a manner that an envelope of an injected mixture cloud has a nearly cylindrical form.

* * * * *

UNITED STATES PATENT AND TRADEMARK OFFICE
CERTIFICATE OF CORRECTION

| | |
|---|---|
| PATENT NO. | : 6,802,296 B2 |
| APPLICATION NO. | : 10/332300 |
| DATED | : October 12, 2004 |
| INVENTOR(S) | : Arndt et al. |

It is certified that error appears in the above-identified patent and that said Letters Patent is hereby corrected as shown below:

Column 3, lines 27-29, According to Fig. 1, no new paragraph.

Column 4, line 13, change "fourth injection plane lid" to --fourth injection plane $11d$--

Column 4, line 36, change "selected suck that" to --selected such that--

Column 4, line 65, change "cloud 25 approximately to" to --cloud 25 approximately the--

Column 5, line 14, change "injection orifices 22" to --injection planes 11a, 11b and 11c, in which eight injection orifices 22--

Column 5, line 51, change "Inner-in" to --Inner in--

Signed and Sealed this

Tenth Day of October, 2006

JON W. DUDAS
*Director of the United States Patent and Trademark Office*